(12) United States Patent
Schmid et al.

(10) Patent No.: US 11,125,868 B2
(45) Date of Patent: Sep. 21, 2021

(54) METHOD AND DEVICE FOR PROCESSING AN ECHO SIGNAL RECEIVED FROM AN ACOUSTIC SENSOR

(71) Applicant: Robert Bosch GmbH, Stuttgart (DE)

(72) Inventors: Dirk Schmid, Simmozheim (DE); Michael Schumann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/648,934

(22) PCT Filed: Sep. 21, 2018

(86) PCT No.: PCT/EP2018/075548
§ 371 (c)(1),
(2) Date: Mar. 19, 2020

(87) PCT Pub. No.: WO2019/057864
PCT Pub. Date: Mar. 28, 2019

(65) Prior Publication Data
US 2020/0284891 A1    Sep. 10, 2020

(30) Foreign Application Priority Data
Sep. 22, 2017  (DE) .......................... 102017216825.0

(51) Int. Cl.
*G01S 7/536* (2006.01)
*G01S 15/931* (2020.01)

(52) U.S. Cl.
CPC ............. *G01S 7/536* (2013.01); *G01S 15/931* (2013.01)

(58) Field of Classification Search
CPC ........ G01S 7/536; G01S 15/931; G01S 7/527; G01N 29/11; G01N 29/4445; G01N 29/48; G01N 2291/044; G01N 2291/015
(Continued)

(56) References Cited

U.S. PATENT DOCUMENTS 4,435,984 A    3/1984   Gruber

FOREIGN PATENT DOCUMENTS

DE   102008041752 A1    3/2010
DE   102012207164 A1   10/2013
(Continued)

OTHER PUBLICATIONS

Description of Reiche EP1562050, 26 pages (Year: 2005).*
International Search Report for PCT/EP2018/075548, dated Dec. 7, 2018.

*Primary Examiner* — Daniel L Murphy
(74) *Attorney, Agent, or Firm* — Norton Rose Fulbright US LLP; Gerard Messina (57) ABSTRACT

A method and device for processing an echo signal received from an acoustic sensor. The echo signal is detected over a measurement time interval. A minimum value is ascertained, which describes a minimum amplitude of the echo signal within the measurement interval. An amplitude value is ascertained, which describes an amplitude of the echo signal within a measurement window. The measurement window is a predefined time interval within the measurement interval. A difference is ascertained between the minimum value and the amplitude value. A determination is made whether the echo signal comprises an interference signal of the first type or an interference signal of the second type, based on the ascertained difference.

9 Claims, 4 Drawing Sheets

(58) Field of Classification Search
USPC .......................................................... 367/87
See application file for complete search history.

(56) References Cited

FOREIGN PATENT DOCUMENTS

DE    102015209282 A1    11/2016
EP        1562050 A1     8/2005
EP        2159601 A2     3/2010

\* cited by examiner

METHOD AND DEVICE FOR PROCESSING AN ECHO SIGNAL RECEIVED FROM AN ACOUSTIC SENSOR

FIELD

The present invention relates to a method and a device for processing an echo signal received from an acoustic sensor.

BACKGROUND INFORMATION

To date, especially in the automotive field, no distinction is made between different types of interferers in the evaluation of echo signals. To date, it is thus in particular not possible to distinguish narrow-band from wide-band interferers. Narrow-band interferers are also called "CW interferers," "CW" being an abbreviation for "continuous wave."

SUMMARY

An example method according to the present invention for processing an echo signal received from an acoustic sensor comprises detecting the echo signal over a measurement time interval, ascertaining a minimum value, which describes a minimum amplitude of the echo signal within the measurement interval, ascertaining an amplitude value, which describes an amplitude of the echo signal within a measurement window, the measurement window being a predefined time interval within the measurement interval, ascertaining a difference between the minimum value and the amplitude value, and determining whether the echo signal comprises an interference signal of the first type or an interference signal of the second type, based on the ascertained difference.

An example device according to the present invention for processing an echo signal received from an acoustic sensor comprises a signal processing unit, which is designed to detect the echo signal over a measurement time interval, to ascertain a minimum value, which describes a minimum amplitude of the echo signal within the measurement interval, to ascertain an amplitude value, which describes an amplitude of the echo signal within a measurement window, the measurement window being a predefined time interval within the measurement interval, to ascertain a difference between the minimum value and the amplitude value, and to determine on the basis of the ascertained difference whether the echo signal comprises an interference signal of the first type or an interference signal of the second type.

The echo signal is an electrical signal, which is provided by the acoustic sensor. The acoustic sensor typically converts a vibration of a diaphragm of an acoustic transducer into an electrical signal, which is called an echo signal and which is provided by the acoustic sensor as an output signal.

The minimum value describes a minimum amplitude of the echo signal within the measurement interval. This means that a minimum excitation of the acoustic sensor is ascertained. For this purpose, only the temporal measurement interval is considered in order to ascertain the minimum value.

The temporal measurement interval preferably begins at a point in time at which an excitation of the acoustic sensor occurs and preferably ends with the beginning of a new excitation of the acoustic sensor. The temporal measurement interval thus results for example from a maximum range of the acoustic signal. The measurement interval preferably comprises at least one period of time, in which the acoustic sensor receives acoustic signals. The measurement interval preferably comprises or corresponds to a time interval, which is also evaluated in the evaluation of the echo signal with regard to a distance measurement using the acoustic sensor.

The amplitude value describes an amplitude of the echo signal within a measurement window. This means that a representative value is ascertained, which describes an amplitude of the echo signal within the measurement window. The amplitude value is a value, which is ascertained over the entire measurement window and which combines the amplitudes occurring in the measurement window into an amplitude value.

The measurement window is a predefined time interval within the measurement interval. An analysis of the amplitude of the echo signal is thus performed within a range limited in time, which is within the measurement interval.

With the minimum value and the amplitude value, two values are ascertained, which both describe respectively an amplitude of the echo signal. A difference between these values is calculated. This means in other words that the minimum value is compared with the amplitude value. The value thus ascertained, that is, the difference between the minimum value and the amplitude value, is suitable for identifying an interference signal present in the echo signal.

Thus the difference is compared in particular with a specified first threshold value, and an interference signal of the first type is determined if the difference is less than the first threshold value. An interference signal of the second type is determined for example if the difference is greater than or equal to a second threshold value. For this purpose, the first threshold value may be equal to the second threshold value. The interference signal of the first type is in particular a narrow-band interference or an interference caused by a CW interferer, and the interference signal of the second type is an interference caused by a wide-band interferer.

Preferred developments of the present invention are described herein.

The measurement window preferably is temporally located in a half of the measurement interval that is an end of the measurement interval. Particularly preferably, the measurement window is temporally located in a quarter of the measurement interval that is an end of the measurement interval. The measurement window in this instance is in particular entirely within the respective half or the respective quarter of the measurement interval. The measurement interval is preferably selected in such a way that it begins with an emission of an acoustic signal by the acoustic sensor, with an end of a settling following an excitation of the acoustic sensor or with a start of a reception phase of the acoustic sensor. Further preferably, the measurement interval is selected in such a way that it ends with an end of a reception phase of the acoustic sensor, following the expiration of a specified time interval or with the start of a subsequent transmission phase of the acoustic sensor. The appropriate selection of the measurement window ensures that the ascertained amplitude value is not influenced by interference effects, which result for example by an excitation of the acoustic sensor or by bottom echoes.

Situating the measurement window in a rear range of the measurement interval ensures that the minimum value and the amplitude value are not falsified by a sensor behavior of the acoustic sensor such as a settling behavior for example.

It is also advantageous if in the ascertainment of the amplitude value an average value and/or a median value of the echo signal is ascertained within the measurement window as the amplitude value. Thus it is possible to ascertain in a simple manner a representative value for the measurement window as the amplitude value.

It is furthermore advantageous if the measurement window is situated exclusively in a temporal range of the measurement interval, in which the echo signal is not dominated by bottom clutter. Bottom clutter is an interference in the echo signal, which is caused by bottom reflections. The temporal range of the measurement interval, in which such bottom clutter occurs, is typically known since it results from a respective position of the acoustic sensor. It is accordingly possible to select the measurement window on the basis of technical considerations in such a way that the measurement window is exclusively in the temporal range of the measurement interval, in which the echo signal is not dominated by the bottom clutter. Interference effects due to bottom reflections are thus avoided.

It is also advantageous if, based on whether the interference signal is an interference signal of the first type or an interference signal of the second type, a signal shape is selected, which is used for an excitation of the acoustic transducer whose echo is found in the echo signal. The acoustic transducer is here preferably a component of the acoustic sensor. The acoustic transducer, however, may also be situated separately from the acoustic sensor. In order to select the signal shape, a control signal is preferably provided. The latter may be used by a control electronics of the acoustic transducer in order to excite the acoustic transducer in accordance with the type of interference signal. Particularly preferably, the acoustic transducer is excited directly by the device for processing the echo signal received from an acoustic sensor. Selecting the signal shape on the basis of the type of interference signal makes it possible to react to existing interferences. The signal shape may thus be selected in such a way that the echo signal in a subsequent evaluation is influenced as little as possible by the existing interference signals.

It is also advantageous if the signal shape is changed in response to the interference signal being an interference signal of the first type. Here it is in particular advantageous if, in the event that the interference signal is an interference signal of the second type, the signal shape is maintained that was also used in a preceding transmission cycle of the acoustic transducer. This makes it possible that the signal shape is changed only if this proves to be advantageous in an evaluation of the echo signal. This avoids disadvantageously influencing a further processing of the echo signal.

It is also advantageous to ascertain, based on the amplitude value and a comparison value, whether an interference signal of the first type or an interference signal of the second type exists or whether no interference signal exists. It is thus first ascertained whether an interference signal exists at all. This preferably occurs before it is determined whether the interference signal comprises an interference signal of the first type or an interference signal of the second type. If it is ascertained that no interference signal exists, then it is possible to skip the step of determining whether the echo signal is an interference signal of the first type or an interference signal of the second type for a current measurement interval.

In particular, it is advantageous if the acoustic sensor is an ultrasonic sensor. Precisely such sensors are often used in the area of automotive application and are often installed on vehicles. Especially in this environment, there are many types of interference signals, and an elimination of interference signals is advantageous when evaluating detected echo signals.

Furthermore, an example vehicle in accordance with the present invention is advantageous, which comprises the acoustic sensor and the device according to the present invention.

BRIEF DESCRIPTION OF THE DRAWINGS

Exemplary embodiments of the present invention are described in detail below with reference to the figures.

DETAILED DESCRIPTION OF EXAMPLE EMBODIMENTS

Figure 1:
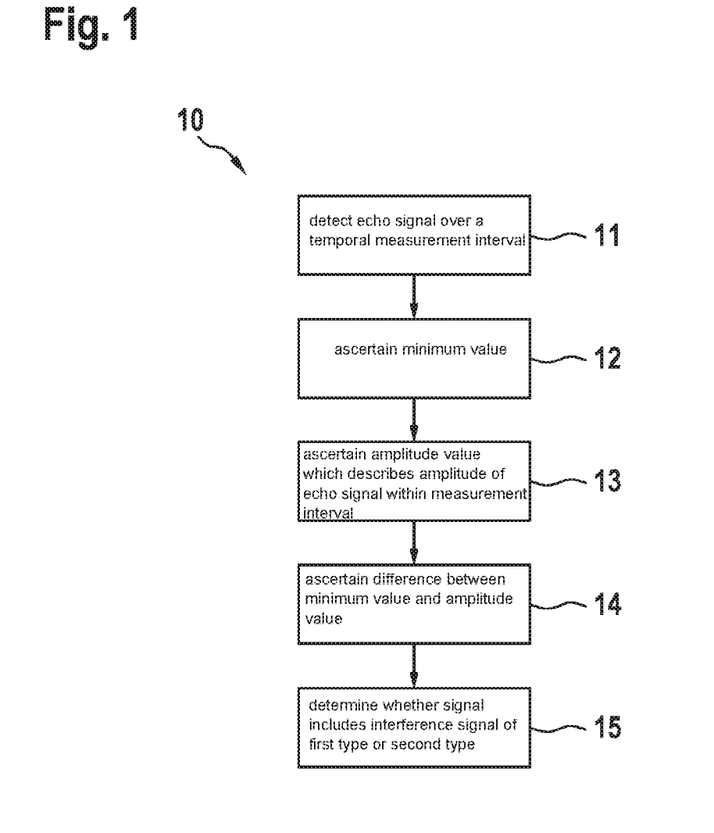
FIG. 1 show a flow chart of the method according to a first specific embodiment of the invention.

FIG. 1 represents a flow chart 10 of an example method for processing an echo signal 20 received from an acoustic sensor 3 according to a first specific embodiment of the present invention. The method represented in FIG. 1 is implemented by a device 1 for processing the echo signal 20 received from acoustic sensor 3. For this purpose, the steps represented in flow chart 10 are implemented by a signal processing unit 2.

Figure 2:
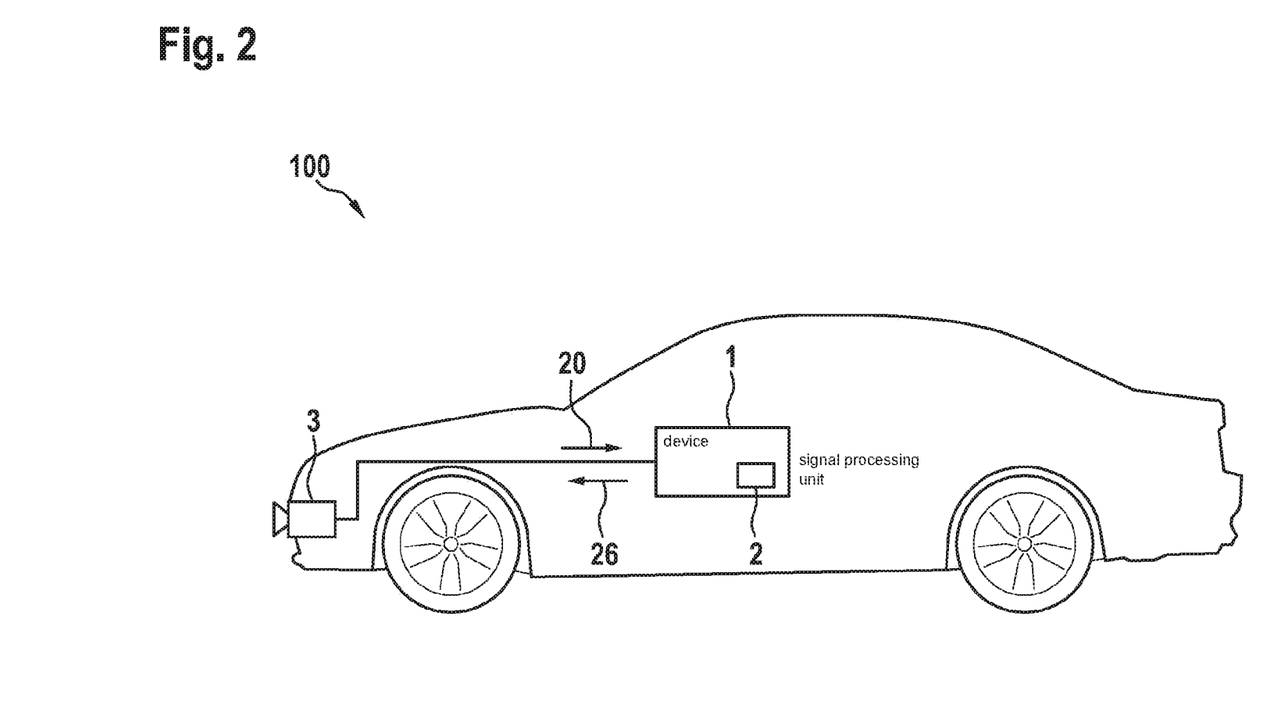
FIG. 2 shows a representation of a vehicle, which comprises a device according to the present invention according to a first specific embodiment of the invention.

Device 1 is shown in FIG. 2, device 1 being situated in a vehicle 100. Furthermore, acoustic sensor 3 is situated on vehicle 100. Device 1 comprises signal processing unit 2. In this first specific embodiment, signal processing unit 2 is a digital processing unit. Acoustic sensor 3 is connected to device 1 via a signal line.

The device according to the present invention and the method according to the present invention according to this first specific embodiment make it possible to determine whether echo signal 20 comprises an interference signal of the first type or an interference signal of the second type. An interference signal of the first type is a narrow-band interference signal. An interference signal of the second type is a wide-band interference signal.

Wide-band interference signals are caused by wide-band interferers and are normally characterized by a wide frequency spectrum. The wide-band frequency spectrum typically covers the entire sensitive detection range of acoustic sensor 3 or even exceeds it. Furthermore, such wide-band interference signals have a stochastic amplitude distribution, which is also referred to as noise. Typical interference sources having significant signal energy in the ultrasonic range are for example tire rolling noises, wind noises, pneumatic hammers at construction sites or pneumatic brakes on trucks.

Narrow-band interferers, which are also called CW interferers, are characterized in the spectrum by narrow lines at a specific frequency. A narrow-band interference may be, acoustically or electromagnetically, coupled into a sensor reception circuit, which is used to control acoustic sensor 3.

Possible sources for narrow-band interferers are induction loops, units in the engine compartment of vehicle 100 such as e.g. pumps or a generator, or turbochargers.

In a first step 11 of the method, echo signal 20 is detected over a temporal measurement interval 21. Echo signal 20 is provided by acoustic sensor 3 of signal processing unit 2. Echo signal 20 is an electrical output signal, which is provided by acoustic sensor 3.

Acoustic sensor 3 comprises an acoustic transducer. During an excitation interval 28, the acoustic transducer is excited by an electrical signal, which is provided by signal processing unit 2 as an excitation signal 26. It should be noted that in alternative specific embodiments excitation signal 26 may also be provided by other control devices. Excitation signal 26 has a specific signal shape, a mechanical vibration of the acoustic transducer being a function of the signal shape. Thus, in excitation interval 28, acoustic sensor 3 and thus the acoustic transducer is provided for example with an excitation signal 26 having a rising or falling frequency, which is also called a chirp signal.

In excitation interval 28, a diaphragm of acoustic sensor 3 is excited by excitation signal 26 to a mechanical vibration and hence begins to vibrate in accordance with excitation signal 26. Subsequently, an acoustic signal is emitted by acoustic sensor 3. This is reflected on objects in the surroundings of acoustic sensor 3 and is reflected to acoustic sensor 3. In a reception interval 29, which follows upon excitation interval 28, the acoustic transducer of acoustic sensor 3 is not excited further by excitation signal 26, but is rather excited to vibrate by received sound waves. Thus the diaphragm of the acoustic transducer is excited in particular by those sound waves that are reflected by the objects in the surroundings of acoustic sensor 3 as an echo.

The mechanical vibrations of the diaphragm of the acoustic transducer caused by the received sound waves are converted into an electrical signal and are provided by acoustic sensor 3 in the output signal.

The output signal of acoustic sensor 3 over the excitation interval and the reception interval is designated as echo signal 20. In this first specific embodiment, echo signal 20 thus comprises information regarding excitation interval 28 and regarding reception interval 29. In alternative specific embodiments, echo signal 20 comprises exclusively information regarding reception interval 29.

Echo signal 20 is provided to signal processing unit 2 via the signal line. Signal processing unit 2 detects echo signal 20 over temporal measurement interval 21. In this specific embodiment, measurement interval 21 is selected in such a way that it comprises exactly one excitation interval 28 and exactly one reception interval 29 following upon excitation interval 28. Measurement interval 21 is thus selected in such a way that it comprises only the excitation interval 28 and the reception interval 29 of a single transmission/reception cycle of acoustic sensor 3. A transmission/reception cycle of acoustic sensor 3 is a time interval in which the acoustic sensor 3 emits an acoustic signal and receives its echoes. Thus, in order to determine whether echo signal 20 comprises an interference signal of the first type or an interference signal of the second type, an individual transmission/reception cycle is preferably considered.

This is followed by an evaluation of echo signal 20 in order to ascertain the amplitude of echo signal 20 over a time characteristic over measurement interval 21.

An amplitude curve 27 of echo signal 20 is thus ascertained. Such an amplitude curve 27 of echo signal 20 is shown in exemplary fashion in FIG. 3. In this instance, the echo signal 20, on which the amplitude curve 27 shown in FIG. 3 is based, was not disturbed by an interferer, that is, it comprises neither an interference signal of the first type nor an interference signal of the second type.

Figure 3:
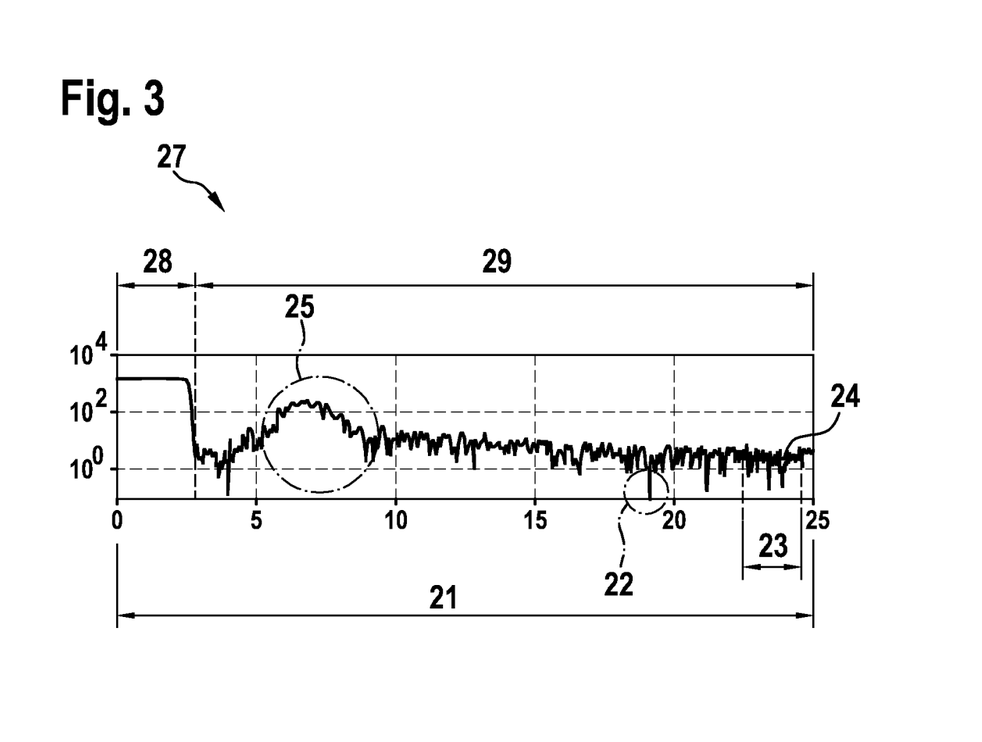
FIG. 3 shows a representation of an amplitude curve of an echo signal over a measurement interval, the echo signal not having been influenced by an interference signal.
Figure 4:
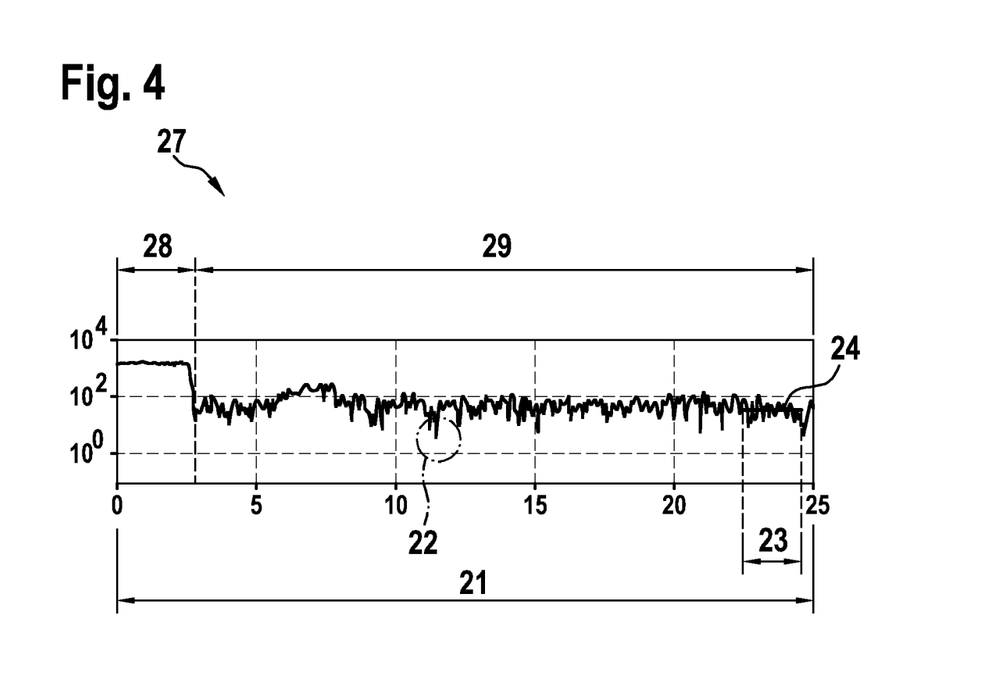
FIG. 4 shows a representation of an amplitude curve of an echo signal over a measurement interval, the echo signal having experienced interference by a wide-band interference signal.
Figure 5:
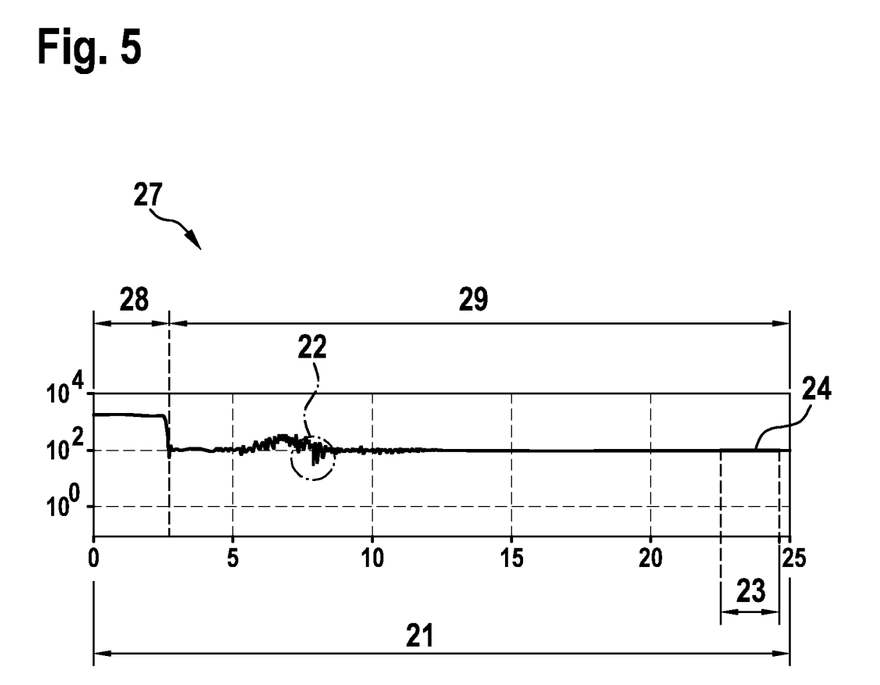
FIG. 5 shows a representation of an amplitude curve of an echo signal over the measurement time interval, the echo signal having experienced interference by a narrow-band interference signal.

The amplitude curves 27 shown in FIGS. 3 through 5 represent different exemplary amplitude curves 27 of echo signal 20, echo signal 20 being subject to various interference effects. A time characteristic is shown over an X axis, which respectively comprises excitation interval 28 and reception interval 29 and which thus corresponds to measurement interval 21. Measurement interval 21 extends over a period of time of 25 ms, selected by way of example. Over a vertical axis, FIGS. 3 through 5 show the amplitude of echo signal 20. Amplitude curve 27 is thus a time characteristic of the amplitude of echo signal 20.

FIG. 3 shows that excitation interval 28, which extends over the first two milliseconds of measurement interval 21, includes a maximum amplitude of echo signal 20. This is due to the fact that acoustic sensor 3 is actively excited in this period of time by excitation signal 26. Following excitation interval 28, acoustic sensor 3 briefly settles, that is, the diaphragm of the acoustic transducer of acoustic sensor 3 settles.

Following the settling, a rise of the amplitude may be seen in a time interval, which extends in the time range between 6 and 8 ms. This is due to the fact that echo signal 20 is dominated by so-called bottom clutter. This is due to the fact that in this specific embodiment the acoustic sensor 3 is situated on vehicle 100 and is thus situated at a defined distance over a roadway surface, on which vehicle 100 is located. Acoustic signals, that is, echoes, are reflected by the roadway surface to the acoustic sensor 3 and thus enter into echo signal 20.

At an end of measurement interval 21, an average value of echo signal 20 drops to the level of a background noise. It may be seen that echo signal 20 has points at which the amplitude curve has a minimum. The minimum is described by a minimum value 22. There are thus points in time at which an amplitude of echo signal 20 reaches nearly the level of zero.

It should be noted that a logarithmic scale obtains in the representations chosen in FIGS. 3 through 5 and that thus represented amplitude differences appear smaller than they actually are.

After echo signal 20 has been detected in first step 11 over temporal measurement interval 21, the minimum value 22 is ascertained in a second step 12, which describes a minimum amplitude of echo signal 20 within measurement interval 21.

The minimum value 22 is thus ascertained in amplitude curve 27 of echo signal 20. This may be done for example by way of a mathematical evaluation or a threshold value detection using a variable threshold value. Minimum value 22 is respectively indicated in FIGS. 3 through 5. I can be seen that minimum value 22 is the value in the respective amplitude curve 27 of echo signal 20, which comes closest to a value of zero on the vertical axis in the representation chosen in FIGS. 3 through 5. If minimum value 22 was ascertained, it is stored.

After minimum value 22 was ascertained in second step 12, a third step 13 is performed. In third step 13, an amplitude value 24 is ascertained, which describes an amplitude of echo signal 20 within a measurement window 23. The measurement window 23 is a predefined time interval within measurement interval 21. Measurement window 23 is selected in such a way that it is situated exclusively in a time range 25 of measurement interval 21, in which echo signal 20 is not dominated by bottom clutter. The time range of measurement interval 21, in which echo signal 20 is dominated by bottom clutter, results from the position of acoustic sensor 3 on vehicle 100. This position defines a distance between acoustic sensor 3 and the roadway surface. Since acoustic sensor 3 is situated on vehicles at a typical height above the roadway surface, it is possible to define in signal processing unit 2 a specified value, which is to be selected as a start time for measurement window 23 so that the latter is with certainty outside of the time range 25, in which echo signal 20 is dominated by bottom clutter. An individual adaptation of measurement window 23 to a position of acoustic sensor 3 on vehicle 100 is advantageous, however.

As may be seen from FIGS. 3 through 5, it is particularly at the end of measurement interval 21 that echo signal 20 or the amplitude of echo signal 20 approaches the level of the background noise. It is therefore advantageous to situate measurement window 23 temporally at the end of measurement interval 21. In the specific embodiment shown, measurement window 23 is situated in a second half of measurement interval 21 and even in a last quarter of measurement interval 21. The length of measurement window 23, that is, the temporal duration over which measurement window 23 extends, is defined in this first specific embodiment as a fixed value of 2 ms.

When ascertaining amplitude value 24, an average value of the amplitude of echo signal 20 is ascertained, the average value being ascertained over measurement window 23. Thus the average value is formed over measurement window 23. The average value thus ascertained is stored as amplitude value 24. As an alternative to the average value, it is also possible to ascertain a median value and to store it as amplitude value 24.

Following the ascertainment of amplitude value 24 in third step 13, a fourth step 14 is performed. In fourth step 14, a difference is ascertained between minimum value 22 and amplitude value 24. Thus, the minimum value 22 that was stored in second step 12 is compared with the amplitude value 24 that was ascertained in third step 13. Based on the difference between minimum value 22 and amplitude value 24, it is possible to perform an inference as to whether an interference signal of the first type or an interference signal of the second type has influenced echo signal 20.

In a fifth step 15, which is performed after fourth step 14, a determination is made as to whether echo signal 20 comprises an interference signal of the first type or an interference signal of the second type. This occurs on the basis of the difference ascertained in fourth step 14.

Before it is determined in fifth step 15 whether echo signal 20 comprises an interference signal of the first type or an interference signal of the second type, however, it is ascertained on the basis of the amplitude value 24 and a comparison value whether an interference signal of the first type or an interference signal of the second type or no interference signal exists. That is to say, it is ascertained whether an interference signal influenced echo signal 20 at all. The comparison value is chosen in such a way that it corresponds to amplitude value 24 if echo signal 20 was not disturbed. The comparison value is thus a preset value.

If amplitude value 24 deviates from the comparison value further than a specified limit, then there exists either an interference signal of the first type or an interference signal of the second type in echo signal 20. In this case, it is possible to determine in the further course of the method whether the interference signal is an interference signal of the first type or an interference signal of the second type.

If amplitude value 24 deviates from the comparison value by less than a specified limit, then there exists no interference signal in echo signal 20. A subsequent determination whether the interference signal is an interference signal of the first type or an interference signal of the second type is omitted.

The evaluation according to the present invention is based on the principle that a background noise level in the echo signal is increased in the event of existing interferences. If it is a wide-band noise interferer, that is, an interference signal of the second type, then echo signal 20 fluctuates greatly. It thus contains in this case a wide amplitude distribution, in which values near zero occur as well. If an existing interference signal is an interference signal of the first type, then a received signal level of echo signal 20 increases as well, but there is nearly no fluctuation of the signal. This has the result that there is a nearly constant signal that at no time equals zero.

During measurement interval 21, the method according to the present invention determines a smallest occurring signal and compares it to the average value described by amplitude value 24. The average value is thus also a median value in measurement window 23 at the end of measurement interval 21. If minimum value 22 is approximately equal to amplitude value 24, that is, equal to the average value, then a CW interferer, that is, an interferer of the first type, may be assumed. If the minimum is clearly smaller than the amplitude value 24, that is, clearly smaller than the average value, or if the minimum is even equal to a value of zero, then a wide-band stochastic interferer, that is, an interferer of the second type, may be inferred. On this matter, reference is also made to FIGS. 4 and 5.

FIG. 4 shows the amplitude curve 27 of echo signal 20, echo signal 20 having been disturbed by a wide-band interference noise, in this example, by compressed air. There thus exists an interference signal of the second type. It may be seen that amplitude value 24 is clearly higher than the amplitude value 24 in FIG. 3. On the basis of this increase, it is possible to ascertain that there exists an interference signal and no undisturbed echo signal 20. By comparing amplitude value 24 with the specified comparison value, it is thus possible to ascertain whether any interference signal influenced the echo signal 20.

The example shown in FIG. 4 shows that in the represented measurement interval 21, the amplitude of echo signal 20 repeatedly drops to low values. It is thus determined that the difference between minimum value 22 and amplitude value 24 is greater than a specified threshold value and that thus there exists an interference signal of the second type, that is, a wide-band interference signal.

FIG. 5 shows the amplitude curve of echo signal 20 for an interference signal of the first type, that is, for a narrow-band interferer, by way of example. It may be seen that amplitude value 24 and thus the average value at the end of measurement interval 21 is likewise clearly increased. It is thus possible to determine that an interference signal influenced echo signal 20 in that amplitude value 24 is compared with the previously mentioned comparison value.

It is furthermore apparent that the difference between minimum value 22 and amplitude value 24 is smaller than in the interference signal of the second type shown in FIG. 4. It is thus determined that the difference between minimum value 22 and amplitude value 24 is smaller than the specified threshold value and that thus there exists an interference signal of the first type, that is, a narrow-band interference signal. It is thus determined that echo signal 20 comprises an interference signal of the first type.

A comparison with the threshold value thus determines whether echo signal 20 is an interference signal of the first type or an interference signal of the second type, the ascertained difference between the minimum value 22 and the amplitude value 24 being compared with the predefined threshold value.

In further advantageous steps of the method, the information thus obtained regarding an existence of an interference signal of the first type or of the second type may be used advantageously. For example, based on whether the interference signal is an interference signal of the first type or an interference signal of the second type, the signal shape is chosen that is used for exciting acoustic transducer 3. The acoustic signal emitted by the acoustic transducer is reflected on objects in the surroundings of acoustic sensor 3 and is reflected to acoustic sensor 3. Thus an echo of the acoustic transducer is found in echo signal 20. In an evaluation of echo signal 20 for ascertaining distances between the objects and the acoustic sensor, adapted optimum filters are applied, which respectively provide only a relevant frequency range for echo detection. Signals outside of this frequency range are damped. The optimum filters are chosen in such a way that they are adapted to a frequency in excitation signal 26. In other words, this means that acoustic sensor 3 emits an acoustic signal at a specific frequency or in a specific frequency spectrum and that echo signal 20 is filtered in such a way that only this frequency spectrum is used for an evaluation for finding received echoes.

If it is determined that echo signal 20 comprises an interference signal of the first type, then it is advantageous to change the signal shape of excitation signal 26. Thus an acoustic signal is emitted in a different frequency range and received echoes are found in a different frequency range of echo signal 20. The optimum filter is accordingly adapted to the signal shape.

If an interference signal of the first type exists, then there is a high probability that an influence of the interference signal is effectively reduced in the evaluation for finding received echoes in a subsequent transmission/reception cycle, and it is possible to maintain the desired range of acoustic sensor 3 in spite of the existing interference influence.

If the interference signal is an interference signal of the second type, that is, if there exists a wide-band interferer, then the change of the frequency range would yield no improvement of the echo detection because the interference signal exists in the entire frequency range and an evasion is thus not possible. It is thus not expedient to change the signal shape of excitation signal 26. Rather, this could result in a deterioration of the echo detection.

In reaction to the interference signal being an interference signal of the first type, it is thus advantageous to change the signal shape by which acoustic sensor 3 is excited to emit the acoustic signal.

Together with the above description, explicit reference is made to the disclosure of FIGS. 1 through 5.

What is claimed is:

1. A method for processing an echo signal received from an acoustic sensor, the method comprising:
   detecting the echo signal over a temporal measurement interval;
   ascertaining a minimum value which describes a minimum amplitude of the echo signal within the measurement interval;
   ascertaining an amplitude value which describes an amplitude of the echo signal within a measurement window, the measurement window being a predefined time interval within the measurement interval;
   ascertaining a difference between the minimum value and the amplitude value; and
   determining, based on the ascertained difference, whether echo signal includes an interference signal of a first type or an interference signal of a second type;
   wherein the interference signal of the first type is a narrow-band interference or an interference caused by a CW interferer,
   wherein the interference signal of the second type is an interference caused by a wide-band interferer, and
   wherein in the ascertainment of the amplitude value, an average value or a median value of the echo signal is ascertained within the measurement window as the amplitude value.

2. The method as recited in claim 1, wherein the measurement window is situated exclusively in a time range of the measurement interval in which the echo signal is not dominated by bottom clutter.

3. The method as recited in claim 1, wherein the acoustic sensor is an ultrasonic sensor.

4. A method for processing an echo signal received from an acoustic sensor, the method comprising:
   detecting the echo signal over a temporal measurement interval;
   ascertaining a minimum value which describes a minimum amplitude of the echo signal within the measurement interval;
   ascertaining an amplitude value which describes an amplitude of the echo signal within a measurement window, the measurement window being a predefined time interval within the measurement interval;
   ascertaining a difference between the minimum value and the amplitude value; and
   determining, based on the ascertained difference, whether echo signal includes an interference signal of a first type or an interference signal of a second type;
   wherein the interference signal of the first type is a narrow-band interference or an interference caused by a CW interferer,
   wherein the interference signal of the second type is an interference caused by a wide-band interferer, and
   wherein the measurement window is temporally situated in no more than a half of the measurement interval and no less than a quarter of the measurement interval, which is an end of the measurement interval.

5. A method for processing an echo signal received from an acoustic sensor, the method comprising:
   detecting the echo signal over a temporal measurement interval;
   ascertaining a minimum value which describes a minimum amplitude of the echo signal within the measurement interval;
   ascertaining an amplitude value which describes an amplitude of the echo signal within a measurement window, the measurement window being a predefined time interval within the measurement interval;
   ascertaining a difference between the minimum value and the amplitude value; and
   determining, based on the ascertained difference, whether echo signal includes an interference signal of a first type or an interference signal of a second type;
   wherein the interference signal of the first type is a narrow-band interference or an interference caused by a CW interferer,
   wherein the interference signal of the second type is an interference caused by a wide-band interferer, and
   wherein, based on whether the interference signal is an interference signal of the first type or an interference signal of the second type, a signal shape is selected, which is used for an excitation of the acoustic transducer, whose echo is found in the echo signal.

6. The method as recited in claim 5, wherein, in reaction to the interference signal being an interference signal of the first type, the signal shape is changed.

7. A method for processing an echo signal received from an acoustic sensor, the method comprising:
- detecting the echo signal over a temporal measurement interval;
- ascertaining a minimum value which describes a minimum amplitude of the echo signal within the measurement interval;
- ascertaining an amplitude value which describes an amplitude of the echo signal within a measurement window, the measurement window being a predefined time interval within the measurement interval;
- ascertaining a difference between the minimum value and the amplitude value; and
- determining, based on the ascertained difference, whether echo signal includes an interference signal of a first type or an interference signal of a second type;
- wherein the interference signal of the first type is a narrow-band interference or an interference caused by a CW interferer, and
- wherein the interference signal of the second type is an interference caused by a wide-band interferer, and
- wherein, based on the amplitude value and a comparison value, it is ascertained whether an interference signal of the first type or an interference signal of the second type exists or whether no interference signal exists.

8. A device for processing an echo signal received from an acoustic sensor, comprising:
- a signal processor configured to perform the following:
  - detecting the echo signal over a temporal measurement interval;
  - ascertaining a minimum value which describes a minimum amplitude of the echo signal within the measurement interval;
  - ascertaining an amplitude value which describes an amplitude of the echo signal within a measurement window, the measurement window being a predefined time interval within the measurement interval;
  - ascertaining a difference between the minimum value and the amplitude value; and
  - determining, based on the ascertained difference, whether the echo signal includes an interference signal of the first type or an interference signal of the second type;
  - wherein the interference signal of the first type is a narrow-band interference or an interference caused by a CW interferer, and
  - wherein the interference signal of the second type is an interference caused by a wide-band interferer.

9. A vehicle, comprising:
an acoustic sensor; and
a device for processing an echo signal received from the acoustic sensor, including a signal processor configured to perform the following:
- detecting the echo signal over a temporal measurement interval;
- ascertaining a minimum value which describes a minimum amplitude of the echo signal within the measurement interval;
- ascertaining an amplitude value which describes an amplitude of the echo signal within a measurement window, the measurement window being a predefined time interval within the measurement interval;
- ascertaining a difference between the minimum value and the amplitude value; and
- determining, based on the ascertained difference, whether the echo signal includes an interference signal of the first type or an interference signal of the second type;
- wherein the interference signal of the first type is a narrow-band interference or an interference caused by a CW interferer, and
- wherein the interference signal of the second type is an interference caused by a wide-band interferer.

* * * * *